(12) United States Patent
Keeney et al.

(10) Patent No.: US 10,715,866 B2
(45) Date of Patent: Jul. 14, 2020

(54) METHOD AND SYSTEM FOR SELECTING DIFFERENT VERSIONS OF ELECTRONIC MEDIA COMPOSITIONS IN REAL TIME

(71) Applicant: Dash Radio Inc., Los Angeles, CA (US)

(72) Inventors: Scott Keeney, Los Angeles, CA (US); John Halterman, Canyon Country, CA (US)

(73) Assignee: DASH RADIO INC., Los Angeles, CA (US)

( * ) Notice: Subject to any disclaimer, the term of this patent is extended or adjusted under 35 U.S.C. 154(b) by 102 days.

(21) Appl. No.: 16/141,670

(22) Filed: Sep. 25, 2018

(65) Prior Publication Data
US 2019/0098360 A1 Mar. 28, 2019

Related U.S. Application Data

(60) Provisional application No. 62/562,967, filed on Sep. 25, 2017.

(51) Int. Cl.
*H04N 21/454* (2011.01)
*H04N 21/262* (2011.01)
(Continued)

(52) U.S. Cl.
CPC ......... *H04N 21/4542* (2013.01); *G06F 3/165* (2013.01); *H04N 21/26258* (2013.01);
(Continued)

(58) Field of Classification Search
CPC ......... H04N 21/4542; H04N 21/26258; H04N 21/4398; H04N 21/47217;
(Continued)

(56) References Cited

U.S. PATENT DOCUMENTS

2003/0196164 A1 10/2003 Gupta et al.
2013/0120662 A1* 5/2013 Houdaille .............. H04N 5/268
348/705

(Continued)

OTHER PUBLICATIONS

Jordà. Faust music on line: An approach to real-time collective composition on the internet. In: Leonardo Music Journal. Retrieved from https://www.dtic.upf.edu/~sergi/IUA_WEB/articles/LMJ9_99.pdf (18 pgs.) (Dec. 1999).

(Continued)

*Primary Examiner* — Kunal Langhnoja
(74) *Attorney, Agent, or Firm* — Wilson Sonsini Goodrich & Rosati

(57) ABSTRACT

The approach disclosed herein allows an end user to seamlessly switch and enjoy different versions of the same composition in a broadcast with one simple user action or gesture such as, for example, a swipe, button, click, or other user action. In particular, by utilizing a plurality of instances of an automation playback system or database with identical media libraries containing different versions of the same compositions, running the different versions of a selected composition locked together, and utilizing mechanics within the application, site, or platform, the user can switch between, for example, an uncensored and censored version of the same composition in real time.

21 Claims, 17 Drawing Sheets

(51) Int. Cl.
    *G06F 3/16*         (2006.01)
    *H04N 21/439*     (2011.01)
    *H04N 21/472*     (2011.01)
    *H04N 21/4402*   (2011.01)

(52) U.S. Cl.
    CPC ... *H04N 21/4398* (2013.01); *H04N 21/44029* (2013.01); *H04N 21/47217* (2013.01)

(58) Field of Classification Search
    CPC ......... H04N 21/44029; H04N 21/4825; H04N 21/23439; G06F 3/165
    See application file for complete search history.

(56) References Cited

U.S. PATENT DOCUMENTS

| | | | |
|---|---|---|---|
| 2014/0195025 A1 | 7/2014 | Wieder et al. | |
| 2015/0106404 A1* | 4/2015 | Boulter | G06F 40/134 |
| | | | 707/793 |
| 2015/0149655 A1* | 5/2015 | Dingle | H04L 47/14 |
| | | | 709/231 |
| 2019/0090035 A1* | 3/2019 | Eksten | H04L 65/604 |

OTHER PUBLICATIONS

PCT/US2018/052674 International Search Report and Written Opinion dated Feb. 7, 2019.

\* cited by examiner

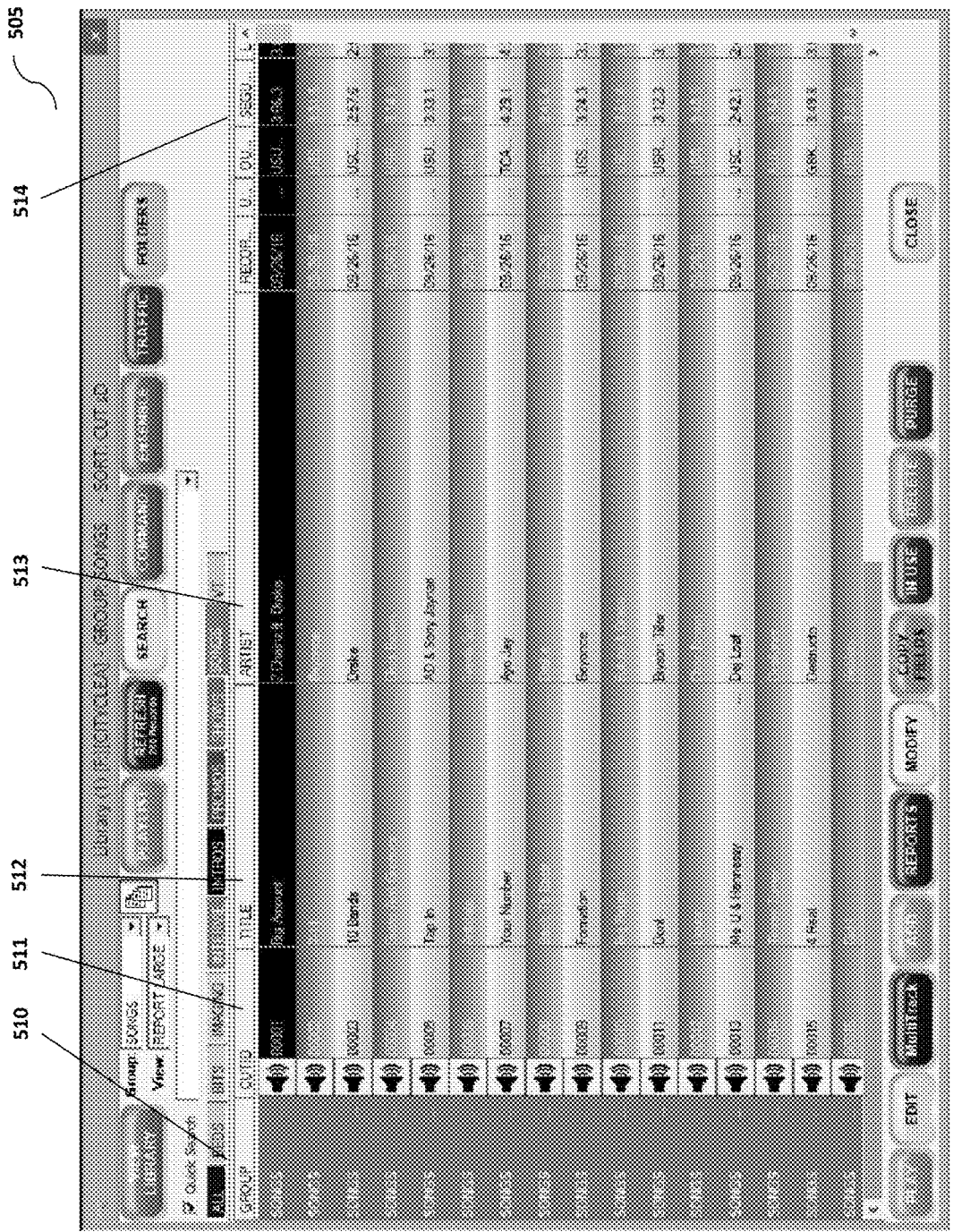
Fig. 5A (Censored)

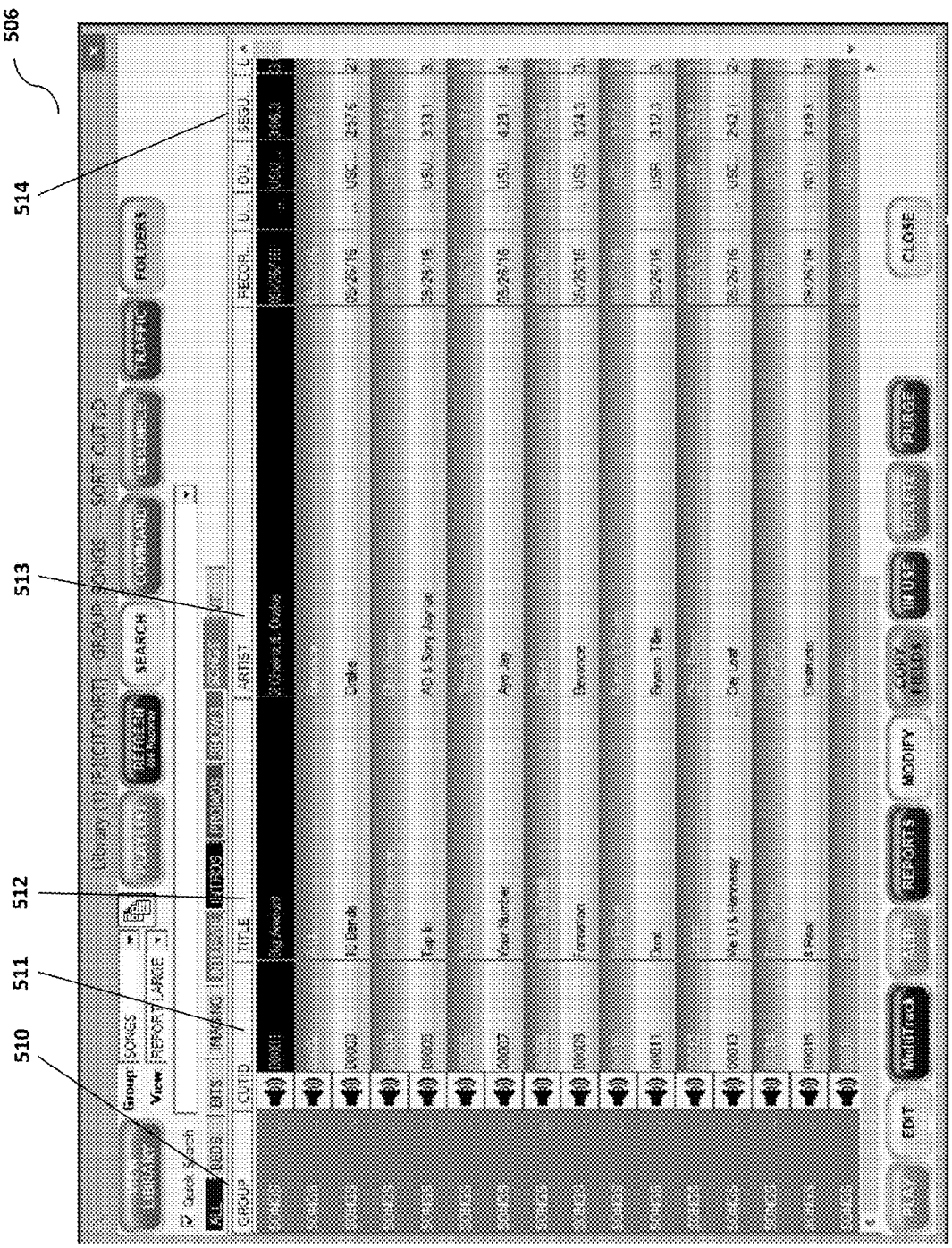
Fig. 5B (Uncensored)

Fig. 6

Fig. 8A (Censored) 805

| TIME | CUT | | P | TITLE | |
|---|---|---|---|---|---|
| 17:21:40 | 🔊 | 03144 | | THE CITY- TODAYS HIP HO... | |
| 17:21:40 | 🔊 | 03169 | * | Walk It Talk It | ... |
| 17:26:16 | 🔊 | 03026 | * | I Like It | ... |
| 17:30:52 | 🔊 | 03054 | * | Run Up | ... |
| 17:34:13 | 🔊 | 03143 | * | THE CITY....(City noise 2) | ... |
| 17:34:13 | 🔊 | 03211 | * | Yikes | ... |
| 17:37:21 | 🔊 | 03094 | * | Sativa | ... |

Playback 3 (3) 0910CTCL
00035 CRZY
0:42.2 USAT21602111
18:11:29 0910CTCL - CITY CLEAN MON 09/10

NEXT
Ret  Chg

Remaining
2:24.6   0:42.2   AUD   STOP

Fig. 8B (Uncensored)

806

Playback 2 (2) 0910CTDR

00035 CRZY

0:42.2 USAT21602111

18:11:29   0910CTDR - CITY DIRTY MON 09/10

NEXT   Ret   Chg

| TIME | CUT | P | TITLE | ARTIST |
|---|---|---|---|---|
| 17:21:40 | 🔊 03169 | * | Walk It Talk It | Migos ft. |
| 17:26:16 | 🔊 03026 | * | I Like It | Cardi B, I |
| 17:30:52 | 🔊 03054 | * | Run Up | Major La： |
| 17:34:13 | 🔊 03143 | * | THE CITY... (City noise 2) | |
| 17:34:13 | 🔊 03211 | * | Yikes | Kanye W |
| 17:37:21 | 🔊 03094 | * | Sativa | Jhene Ai |
| 17:41:18 | 🔊 03164 | * | Diamonds | Rihanna |

Remaining

2:24.6   0:42.2   AUD   STOP

Fig. 9A (Censored)
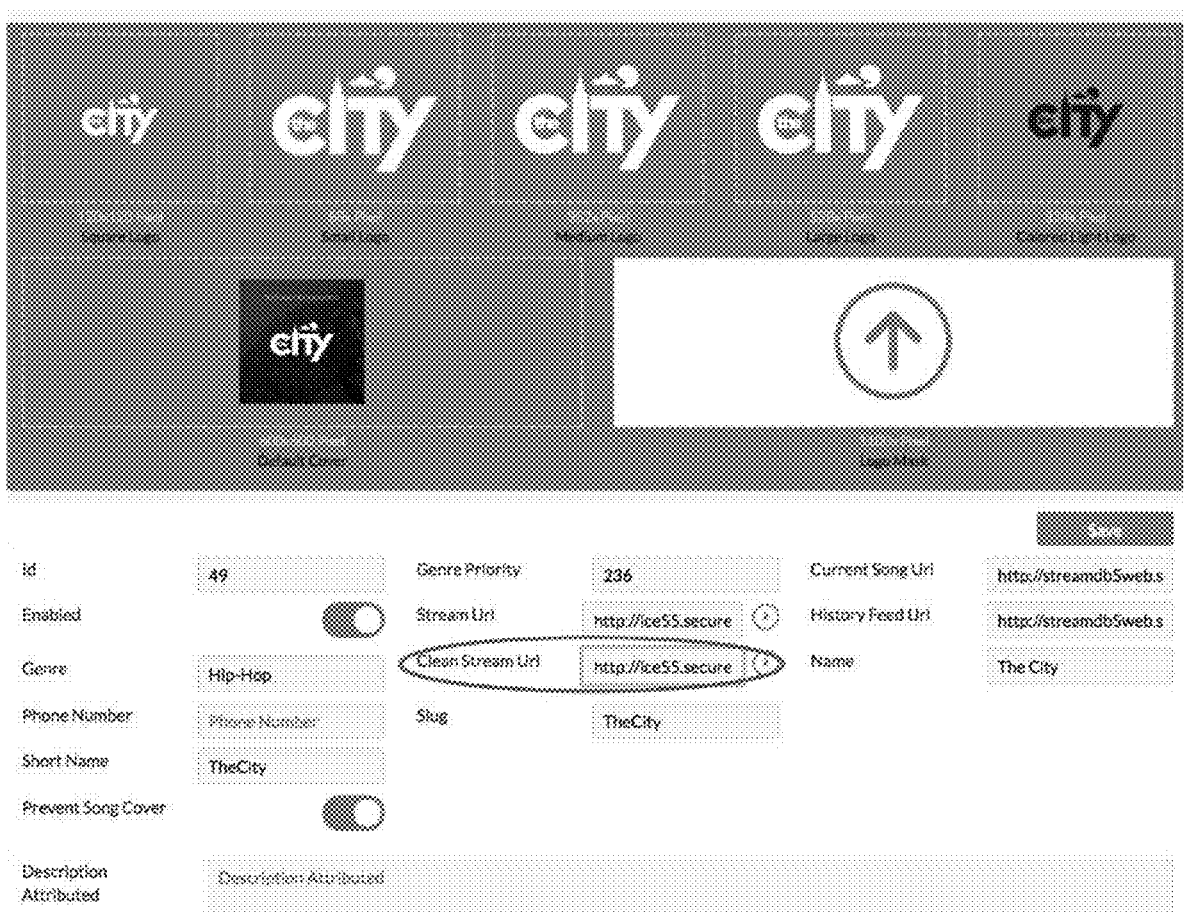

Fig. 9B (Uncensored)
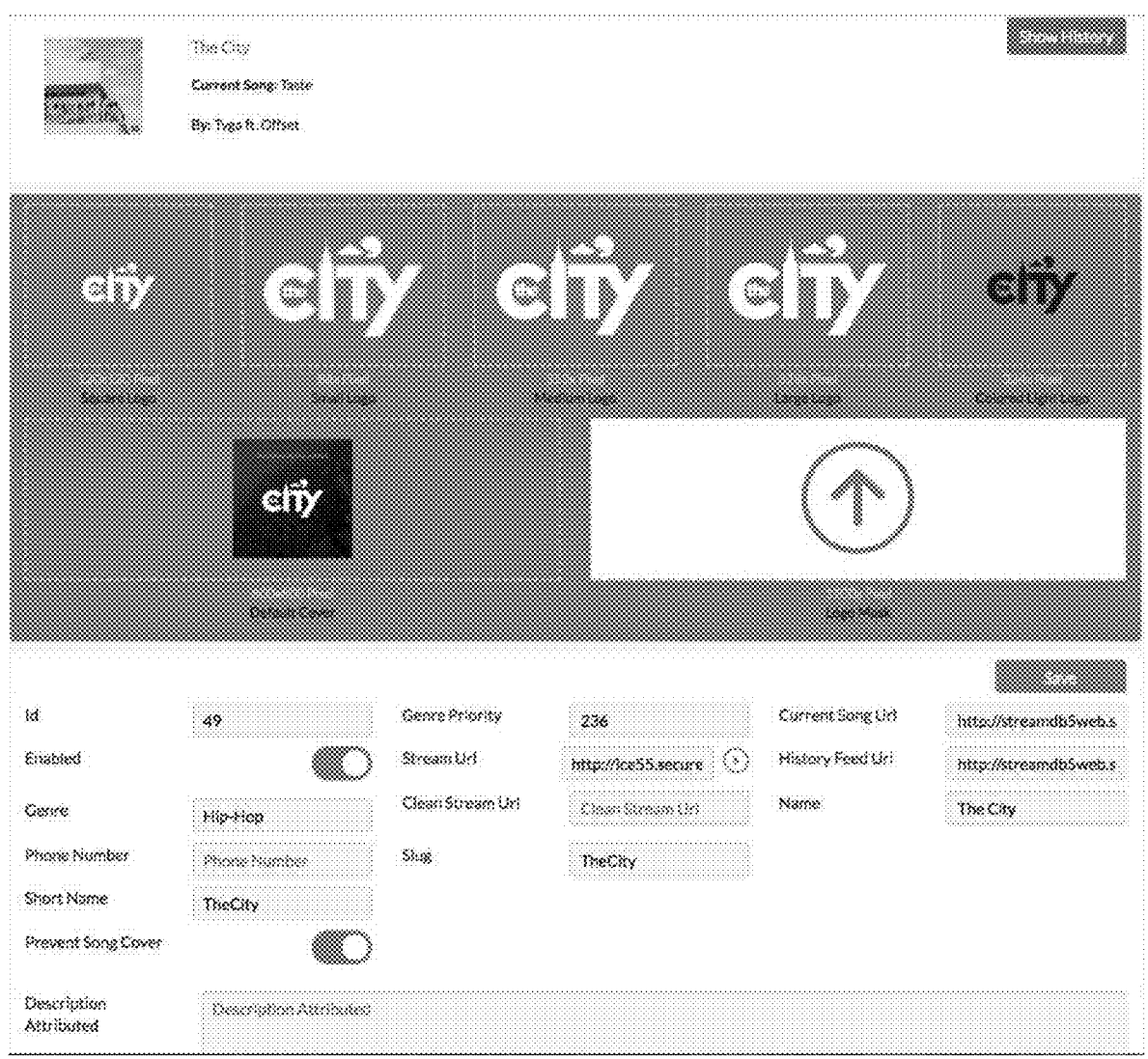

METHOD AND SYSTEM FOR SELECTING DIFFERENT VERSIONS OF ELECTRONIC MEDIA COMPOSITIONS IN REAL TIME

CROSS-REFERENCE

This application claims the benefit of the U.S. Provisional Application No. 62/562,967, filed Sep. 25, 2017, which application is incorporated herein by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Since the inception of broadcast radio, content on terrestrial has for the majority been censored. The eventual introduction of internet radio and subsequent launch of satellite radio provided listeners with an outlet to find uncensored music and content previously unavailable. The present challenge is being able to enjoy this newly available content in a non-offensive way and according to a listener's particular preferences. What is needed is the ability to control which versions of compositions we listen to, watch, or enjoy in real time. Specifically, it would be desirable to have an application that allows a user to have access to songs, videos, shows, and other compositions, whether live or recorded, with the option in real time to censor out words and content deemed inappropriate.

SUMMARY OF THE INVENTION

The approach disclosed herein is to create a solution in the form of a technological tool that enables an end user to switch between different versions of a broadcast while listening to that broadcast in real time. For example, an end user who may be listening to a particular channel that is broadcasting an uncensored version of a composition can, by use of a simple action or gesture, listen to the same exact composition in a censored fashion in real time. Specifically, if a user listens to a particular show on the platform as disclosed herein, and that show contains profanity, by using a simple action or gesture (e.g., applying pressure or motion sensed by a device such as a finger press on an icon or button, swipe, click, making a motion over the device, shaking or otherwise moving the device, or any other type of UI gesture implemented by a developer), the broadcast is switched to a censored version of the show in real time. In so doing, the instant technological tool offers, in some embodiments, a unique arrangement of features to filter the content of broadcast composition. In other embodiments, the option to switch to an alternative version is not limited to only a censored version. In some embodiments, the user may be provided the option to switch to a plurality of different feeds of the composition comprising a plurality of versions of the original composition. In other embodiments, the plurality of different feeds comprises compositions of differing lengths. The composition may comprise audio and video components and may be broadcasted live or from a recording. In addition, the various different versions of the composition may have varying degrees of censorship and/or corresponding ratings, and an end user may select or switch between the different versions of the composition according to the user's particular tastes or preferences.

In one aspect, disclosed herein is a platform to provide an electronic media file playback application that allows a user to switch between different versions of an electronic media composition in real time. The platform can comprise a mobile processor configured to execute instructions from one or more software modules. In one embodiment, a scheduling software module can comprise instructions for generating at least one daily log that can include an ordered list of electronic media compositions. Each electronic media composition in the at least one daily log can have an associated time of day designating when each electronic media composition is scheduled to be played in a 24-hour period. Additionally, an automation software module can comprise instructions for loading the at least one daily log into a plurality of instances. Each of the instances can correspond to an electronic media library in a plurality of electronic media libraries. The automation software module can also include instructions for converting the plurality of instances into a plurality of identical playlists associated with each of the electronic media libraries. Moreover, each identical playlist can comprise the ordered list of electronic media compositions as set forth in the at least one daily log. The automation software module can further include instructions for generating an output comprising a plurality of playback streams using each of the identical playlists. Each of the plurality of playback streams can correspond to electronic media files located in each of the electronic media libraries in the plurality of electronic media libraries. Finally, an encoder software module can include instructions for encoding the plurality of playback streams.

The platform can further comprise a server processor configured to execute instructions from one or more software modules. For example, one or more of the software modules can comprise instructions to route the plurality of playback streams from an encoder to a streaming server, to a backend API, and to an end device. The plurality of playback streams can be configured to stream at the same time and in a synchronized manner. In addition, the end device can be configured to allow a user to play an electronic media composition and switch between different versions of the electronic media composition in real time. The electronic media composition can comprise at least one of an audio composition and a video composition and the different versions of the electronic media composition can comprise a censored version and an uncensored version. In some embodiments, the at least one daily log comprises a plurality of daily logs. In some embodiments, the different versions of the electronic media composition comprise an original version and at least one altered version. In some embodiments, the original version and the at least one altered version have different lengths of time.

In another aspect, disclosed herein is a computer-implemented system to provide an electronic media file playback application that allows a user to switch between different versions of an electronic media composition in real time. The system can include a digital processing device comprising at least one processor, an operating system configured to perform executable instructions, a memory, and a computer program including instructions executable by the digital processing device. The memory can comprise storage for housing a collection of electronic media compositions. Each of the electronic media compositions in the collection can have a unique identifier. In addition, different versions of each of the electronic media compositions in the collection can be stored in a plurality of electronic media libraries, wherein each of the electronic media libraries comprises the same collection of electronic media compositions, and wherein a different version of each electronic media composition resides in each of the plurality of electronic media libraries.

The computer program can include instructions for generating at least one daily log comprising an ordered list of electronic media compositions. Each electronic media composition in the at least one daily log can have an associated time of day designating when each electronic media composition is scheduled to be played in a 24-hour period. The computer program can also include instructions for: (1) loading the at least one daily log into a plurality of instances, where each of the instances can correspond to each of the electronic media libraries in the plurality of electronic media libraries; (2) converting the plurality of instances into a plurality of identical playlists associated with each of the electronic media libraries, where each identical playlist can comprise the ordered list of electronic media compositions in the at least one daily log; (3) using each of the identical playlists, generating an output comprising a plurality of playback streams, where each of the plurality of playback streams can correspond to the electronic media files in each of the electronic media libraries in the plurality of electronic media libraries; (4) sending the generated output to an encoder that can be configured to receive and encode the plurality of playback streams; (5) encoding the plurality of playback streams; (6) sending the encoded plurality of playback streams to an electronic media streaming server; (7) sending the encoded plurality of playback streams from the electronic media streaming server to a backend API; and (8) sending the encoded plurality of playback streams from the backend API to an end device. Notably, the playback streams can be configured to stream at the same time and in a synchronized manner. Furthermore, the end device can be configured to allow a user to play an electronic media composition and switch between different versions of the electronic media composition in real time. The electronic media composition can comprise at least one of an audio composition and a video composition and the different versions of the electronic media composition can comprise a censored version and an uncensored version. In some embodiments, the at least one daily log comprises a plurality of daily logs. In some embodiments, the different versions of the electronic media composition comprise an original version and at least one altered version. In some embodiments, the original version and the at least one altered version have different lengths of time.

In another aspect, disclosed herein are non-transitory computer-readable storage media encoded with a computer program including instructions executable by a processor to provide an electronic media file playback application that allows a user to switch between different versions of an electronic media composition in real time. The media can comprise a database, recorded on the media, comprising a collection of electronic media compositions, wherein each of the electronic media compositions in the collection has a unique identifier and different versions of each of the electronic media compositions in the collection are stored in a plurality of electronic media libraries. Each of the electronic media libraries can comprise the same collection of electronic media compositions. Moreover, a different version of each electronic media composition can reside in each of the plurality of electronic media libraries The media can further comprise a scheduling software module with instructions for generating at least one daily log. The at least one daily log can include an ordered list of electronic media compositions, each electronic media composition having an associated time of day designating when each electronic media composition is scheduled to be played in a 24-hour period.

The media can also include an automation software module comprising instructions for: (1) loading the at least one daily log into a plurality of instances, each of the instances corresponding to an electronic media library in a plurality of electronic media libraries; (2) converting the plurality of instances into a plurality of identical playlists associated with each of the electronic media libraries, each identical playlist comprising the ordered list of electronic media compositions in the at least one daily log; (3) using each of the identical playlists, generating an output comprising a plurality of playback streams, wherein each of the plurality of playback streams corresponds to electronic media files in each of the electronic media libraries in the plurality of electronic media libraries; (4) an encoder software module comprising instructions for encoding the plurality of playback streams; and (5) a software module comprising instructions to route the plurality of playback streams from an encoder to a streaming server, to a backend API, and to an end device. Notably, the plurality of playback streams can be configured to stream at the same time and in a synchronized manner. Furthermore, the end device can be configured to allow a user to play an electronic media composition and switch between different versions of the electronic media composition in real time. The electronic media composition can comprise at least one of an audio composition and a video composition and the different versions of the electronic media composition can comprise a censored version and an uncensored version. In some embodiments, the at least one daily log comprises a plurality of daily logs. In some embodiments, the different versions of the electronic media composition comprise an original version and at least one altered version. In some embodiments, the original version and the at least one altered version have different lengths of time.

In another aspect, disclosed herein is a computer-implemented method of playing one or more electronic media files that allows a user to switch between different versions of an electronic media composition. The different versions of the electronic media composition can be embodied in the one or more electronic media files. In addition, the method can comprise: (1) providing a collection of electronic media compositions, wherein each of the electronic media compositions in the collection has a unique identifier; (2) providing different versions of each of the electronic media compositions in the collection, each version being embodied in an electronic media file, wherein each version of each of the electronic media compositions has the same unique identifier associated with one of the electronic media compositions; (3) providing a plurality of electronic media libraries, each electronic media library comprising the same collection of electronic media compositions, wherein a different version of each electronic media composition resides in each of the plurality of electronic media libraries; (4) generating or providing at least one daily log comprising an ordered list of electronic media compositions selected from the collection of electronic media compositions, each electronic media composition in the at least one daily log having an associated time of day designating when each electronic media composition is scheduled to be played in a 24-hour period; (5) providing an automation system that interfaces with the plurality of electronic media libraries to generate an output comprising a plurality of playback streams; (5) sending, by the computer, the output from the automation system to an encoder configured to receive and encode the plurality of playback streams; (6) sending, by the computer, the encoded plurality of playback streams to an electronic media streaming server; (7) sending, by the computer, the plurality of playback streams from the electronic media streaming server to a backend API; and (8) sending, by the computer, the plurality of playback streams from the backend API to an end device. Notably, the playback streams can be configured to stream at the same time and in a synchronized manner. Furthermore, the end device can be configured to allow a user to play an electronic media composition and switch between different versions of the electronic media composition in real time.

The automation system can be configured to independently perform the steps of: (1) loading the at least one daily log into a plurality of instances, each of the instances corresponding to a respective electronic media library in the plurality of electronic media libraries; (2) converting the plurality of instances into a plurality of identical playlists associated with each of the respective media libraries, each identical playlist comprising the ordered list of electronic media compositions in the at least one daily log; and (3) using each of the identical playlists, generating an output comprising a plurality of playback streams. Each of the plurality of playback streams can correspond to the electronic media files in each of the respective electronic media libraries in the plurality of electronic media libraries.

The electronic media composition in the method can comprise at least one of an audio composition and a video composition and the different versions of the electronic media composition can comprise a censored version and an uncensored version. In some embodiments, the electronic media composition share a set of identical attributes associated with one or the electronic media compositions. In some embodiments, the electronic media composition share a set of different attributes associated with one of the electronic media compositions. In some embodiments, the different versions of the electronic media composition comprise an original version and at least one altered version.

The end device of the method can be configured to allow a user to switch between different versions of the electronic media composition in real time by, for example, pressing a surface of the end device, sliding a finger across a surface of the end device, shaking the end device, making a gesture sensed by the end device, providing a motion sensed by the end device, or any other user action that can be recognized by the end device.

In a different aspect, the aforementioned platforms, systems, medias, and methods do not comprise feeds from a scheduling software. In additional aspects, the aforementioned platforms, systems, medias, and methods comprise electronic media source feeds from a live broadcast. In additional aspects, the aforementioned platforms, systems, medias, and methods comprise electronic media source feeds from any electronic media source. In further aspects, the aforementioned platforms, systems, medias, and methods do not comprise an automation system.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 5A and 5B show an exemplary view of two music libraries as used in an exemplary method and system of the present disclosure;

FIG. 6 shows an exemplary view of one instance of Music Scheduling software as used in an exemplary method and system of the present disclosure;

FIGS. 8A and 8B show an exemplary view of two instances of an Automation System corresponding to two music libraries as used in an exemplary method and system of the present disclosure;

FIGS. 9A and 9B show an exemplary view of two streams or channels as used in an exemplary method and system of the present disclosure;

DETAILED DESCRIPTION OF THE INVENTION

Currently there is no capability for a radio station/channel/streaming music service/video broadcast/live stream/podcast/music library to offer the same composition in both an uncensored and censored version. For example, when listening to an explicit channel on satellite radio or streaming radio, there is no option to listen to that same exact composition in an edited or censored fashion in real time.

The approach disclosed herein allows an end user to seamlessly switch and enjoy different versions of the same composition in a broadcast with one simple user action or gesture such as, for example, a swipe, button, click, or other user action. In particular, by utilizing a plurality of instances of an automation playback system or database with identical media libraries containing different versions of the same compositions, running the different versions of a selected composition locked together, and utilizing mechanics within the application, site, or platform, the user can switch between, for example, an uncensored and censored version of the same composition in real time. In another embodiment, the option to switch to an alternative version is not limited to only a censored version. In some embodiments, the user may be provided the option to switch to a plurality of different feeds of the composition comprising a plurality of versions of the original composition. In some embodiments, the plurality of different feeds of the composition comprises compositions of differing lengths or differing data sizes.

While the examples described herein focus on audio content, music compositions, and songs, the method and system disclosed is not limited to such content and can be applied to any other content, such as video or combinations of audio or video compositions that may be broadcast or made available to an end user.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Overview

Figure 1A:
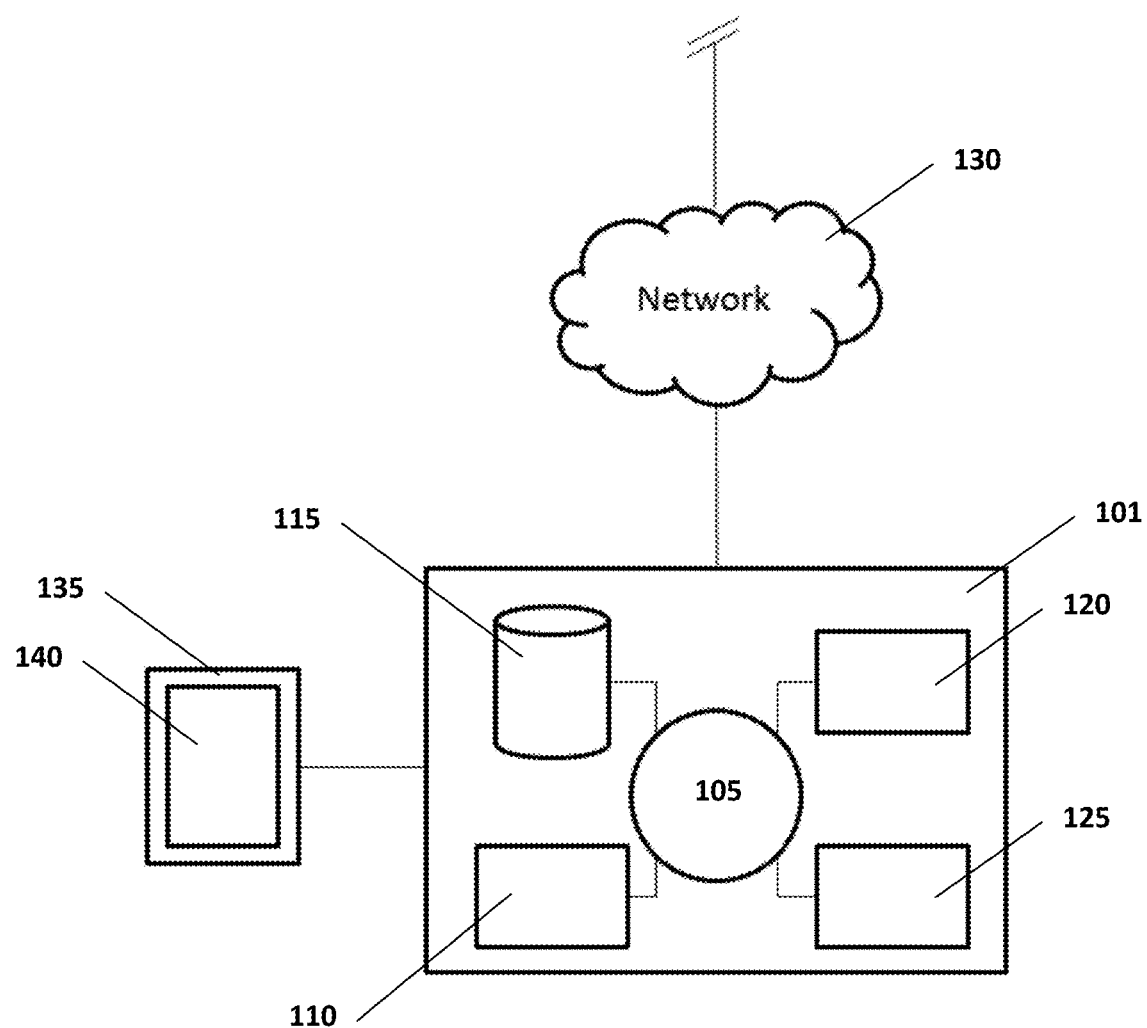
FIG. 1A shows a non-limiting example of a digital processing device; in this case, a device with one or more CPUs, a memory, a communication interface, and a display.
Figure 1B:
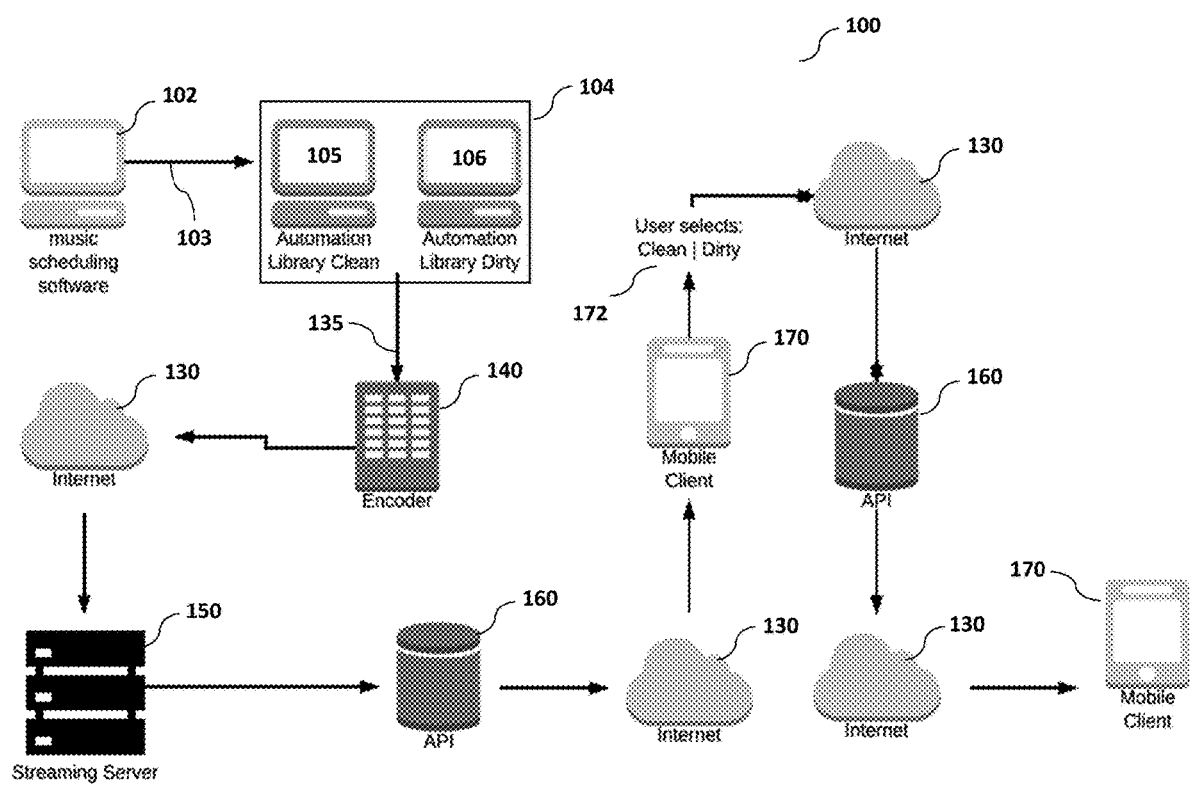
FIG. 1B shows an exemplary embodiment of a computer-implemented system to provide an electronic media file playback application that allows a user to switch between different versions of an electronic media composition in real time.

Described herein, in certain embodiments, is a platform to provide an electronic media file playback application that allows a user to switch between different versions of an electronic media composition in real time. As shown in FIG. 1A, the platform 101 can comprise a mobile processor 105 configured to execute instructions from one or more software modules 110. As shown in FIG. 1B, in one embodiment, a scheduling software module 102 can comprise instructions for generating a daily log 103 that can include an ordered list of electronic media compositions. Each electronic media composition in the daily log can have an associated time of day designating when each electronic media composition is scheduled to be played in a 24-hour period. In some embodiments, the scheduling software does not comprise an automation software module 104 (e.g., in circumstances when electronic media composition feeds are from live sources). In some embodiments, the user can select between a first version and one or more altered versions (e.g., not limited to just censored version and uncensored versions). In some embodiments, the multiple versions comprise feeds from one DJ and a second DJ. In some embodiments, the multiple versions comprise feeds from one location and a second location (e.g., West Coast feed versus East Coast feed). In some embodiments, the multiple versions comprise feeds from pre-taped feeds. In some embodiments, the multiple versions comprise subfeeds from one station.

Additionally, as shown in FIG. 1B, an automation software module 104 can comprise instructions for loading the daily log into a plurality of instances. Each of the instances can correspond to an electronic media library (e.g., 105 and 106 in FIG. 1B) in a plurality of electronic media libraries. In some embodiments, no daily log is loaded. Instead, in some embodiments, the software can accept a plurality of live feeds. The automation software module 104 can also include instructions for converting the plurality of instances into a plurality of identical playlists associated with each of the electronic media libraries. Moreover, each identical playlist can comprise the ordered list of electronic media compositions as set forth in the daily log. The automation software module can further include instructions for generating an output 135, as shown in FIG. 1B, comprising a plurality of playback streams using each of the identical playlists. Each of the plurality of playback streams can correspond to electronic media files located in each of the electronic media libraries in the plurality of electronic media libraries. Finally, as shown in FIG. 1A, an encoder software module 140 can include instructions for encoding the plurality of playback streams.

As shown in FIG. 1B, the platform can further comprise a server processor 150 configured to execute instructions from one or more software modules. For example, one or more of the software modules can comprise instructions to route the plurality of playback streams from an encoder 140 to a streaming server 150, to a backend API 160, and to an end device or mobile client 170. The plurality of playback streams can be configured to stream at the same time and in a synchronized manner. In addition, the end device 170 can be configured to allow a user to play an electronic media composition and switch between different versions of the electronic media composition in real time. The electronic media composition can comprise at least one of an audio composition and a video composition and the different versions of the electronic media composition can comprise a censored version and an uncensored version.

Also described herein, in certain embodiments, is a computer-implemented system to provide an electronic media file playback application that allows a user to switch between different versions of an electronic media composition in real time. As shown in FIG. 1A, the system can include a digital processing device 101 comprising at least one processor 105, an operating system configured to perform executable instructions, a memory 110, and a computer program including instructions executable by the digital processing device. The memory can comprise storage for housing a collection of electronic media compositions. Each of the electronic media compositions in the collection can have a unique identifier. In addition, different versions of each of the electronic media compositions in the collection can be stored in a plurality of electronic media libraries (see e.g., 105 and 106 in FIG. 1B), wherein each of the electronic media libraries comprises the same collection of electronic media compositions, and wherein a different version of each electronic media composition resides in each of the plurality of electronic media libraries. In some embodiments, the user can select between a first version and one or more altered versions (e.g., not limited to just censored version and uncensored versions). In some embodiments, the multiple versions comprise feeds from one DJ and a second DJ. In some embodiments, the multiple versions comprise feeds from one location and a second location (e.g., West Coast feed versus East Coast feed). In some embodiments, the multiple versions comprise feeds from pre-taped feeds. In some embodiments, the multiple versions comprise subfeeds from one station.

As shown in FIG. 1B, the computer program can include instructions for generating a daily log 103 comprising an ordered list of electronic media compositions. Each electronic media composition in the daily log can have an associated time of day designating when each electronic media composition is scheduled to be played in a 24-hour period. The computer program can also include instructions for: (1) loading the daily log into a plurality of instances, where each of the instances can correspond to each of the electronic media libraries in the plurality of electronic media libraries; (2) converting the plurality of instances into a plurality of identical playlists associated with each of the electronic media libraries, where each identical playlist can comprise the ordered list of electronic media compositions in the daily log; (3) using each of the identical playlists, generating an output comprising a plurality of playback streams, where each of the plurality of playback streams can correspond to the electronic media files in each of the electronic media libraries in the plurality of electronic media libraries; (4) sending the generated output to an encoder that can be configured to receive and encode the plurality of playback streams; (5) encoding the plurality of playback streams; (6) sending the encoded plurality of playback streams to an electronic media streaming server; (7) sending the encoded plurality of playback streams from the electronic media streaming server to a backend API; and (8) sending the encoded plurality of playback streams from the backend API to an end device. Notably, the playback streams can be configured to stream at the same time and in a synchronized manner. Furthermore, as shown in FIG. 1B, the end device 170 can be configured to allow a user to play an electronic media composition and switch (at 172 of FIG. 1B) between different versions of the electronic media composition in real time. The electronic media composition can comprise at least one of an audio composition and a video composition and the different versions of the electronic media composition can comprise a censored version and an uncensored version. In some embodiments, the user can select between a first version and one or more altered versions (e.g., not limited to just censored version and uncensored versions). In some embodiments, the multiple versions comprise feeds from one DJ and a second DJ. In some embodiments, the multiple versions comprise feeds from one location and a second location (e.g., West Coast feed versus East Coast feed). In some embodiments, the multiple versions comprise feeds from pre-taped feeds. In some embodiments, the multiple versions comprise subfeeds from one station.

Also described herein, in certain embodiments, are non-transitory computer-readable storage media encoded with a computer program including instructions executable by a processor to provide an electronic media file playback application that allows a user to switch between different versions of an electronic media composition in real time. The media can comprise a database, recorded on the media, comprising a collection of electronic media compositions, wherein each of the electronic media compositions in the collection has a unique identifier and different versions of each of the electronic media compositions in the collection are stored in a plurality of electronic media libraries. Each of the electronic media libraries can comprise the same collection of electronic media compositions. Moreover, a different version of each electronic media composition can reside in each of the plurality of electronic media libraries. In some embodiments, the user can select between a first version and one or more altered versions (e.g., not limited to just censored version and uncensored versions). In some embodiments, the multiple versions comprise feeds from one DJ and a second DJ. In some embodiments, the multiple versions comprise feeds from one location and a second location (e.g., West Coast feed versus East Coast feed). In some embodiments, the multiple versions comprise feeds from pre-taped feeds. In some embodiments, the multiple versions comprise subfeeds from one station.

The media can further comprise a scheduling software module with instructions for generating a daily log. The daily log can include an ordered list of electronic media compositions, each electronic media composition having an associated time of day designating when each electronic media composition is scheduled to be played in a 24-hour period.

The media can also include an automation software module comprising instructions for: (1) loading the daily log into a plurality of instances, each of the instances corresponding to an electronic media library in a plurality of electronic media libraries; (2) converting the plurality of instances into a plurality of identical playlists associated with each of the electronic media libraries, each identical playlist comprising the ordered list of electronic media compositions in the daily log; (3) using each of the identical playlists, generating an output comprising a plurality of playback streams, wherein each of the plurality of playback streams corresponds to electronic media files in each of the electronic media libraries in the plurality of electronic media libraries; (4) an encoder software module comprising instructions for encoding the plurality of playback streams; and (5) a software module comprising instructions to route the plurality of playback streams from an encoder to a streaming server, to a backend API, and to an end device. Notably, the plurality of playback streams can be configured to stream at the same time and in a synchronized manner. Furthermore, the end device can be configured to allow a user to play an electronic media composition and switch between different versions of the electronic media composition in real time. The electronic media composition can comprise at least one of an audio composition and a video composition and the different versions of the electronic media composition can comprise a censored version and an uncensored version.

Figure 2A:
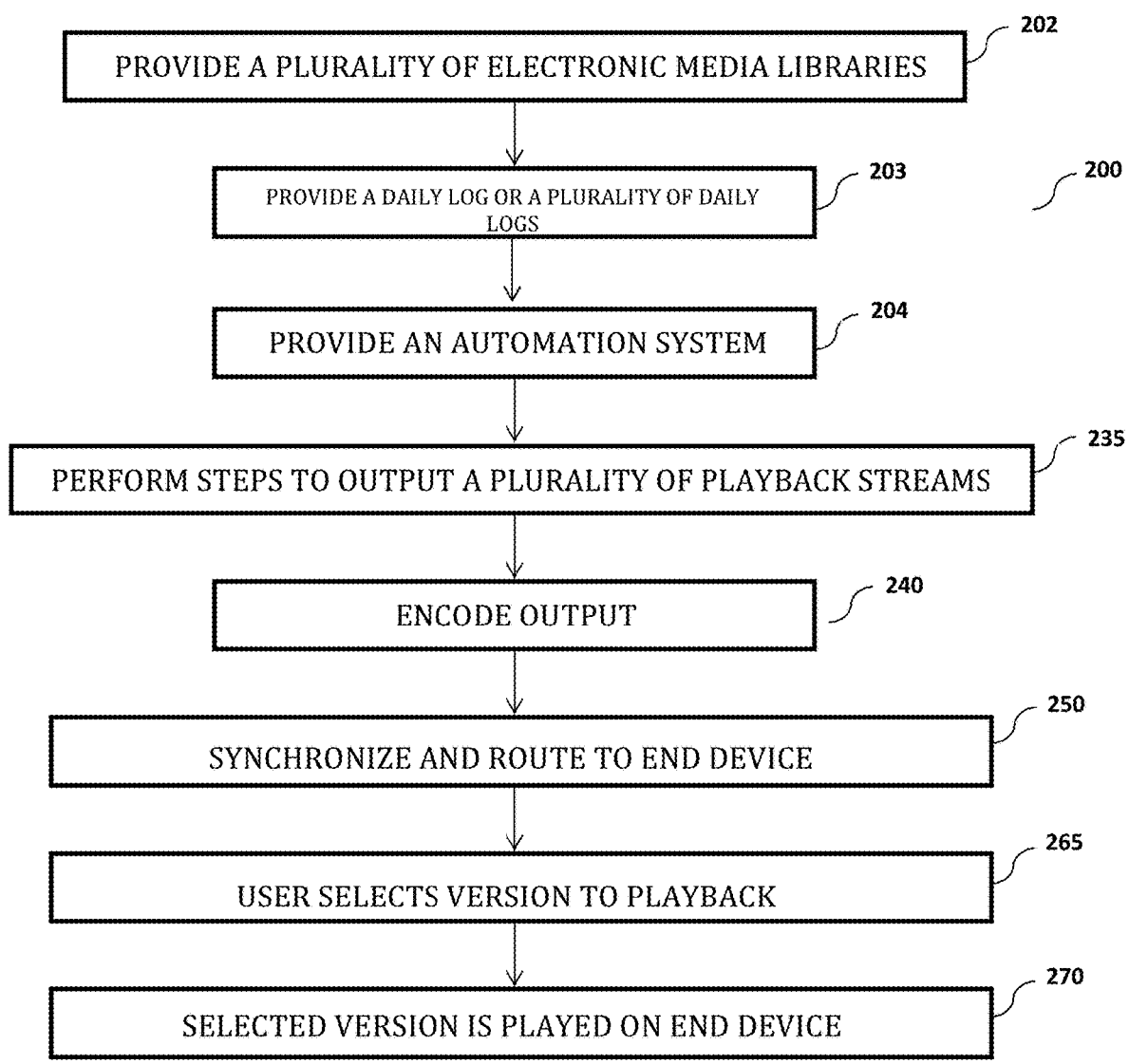
FIGS. 2A and 2B shows an exemplary embodiment of computer-implemented method of playing one or more electronic media files that allows a user to switch between different versions of an electronic media composition.

Also described herein, in certain embodiments as shown for example in FIG. 2A, is a computer-implemented method 200 of playing one or more electronic media files that allows a user to switch between different versions of an electronic media composition. The different versions of the electronic media composition can be embodied in the one or more electronic media files. In addition, the method can comprise: (1) providing a collection of electronic media compositions (not shown), wherein each of the electronic media compositions in the collection has a unique identifier; (2) providing different versions of each of the electronic media compositions in the collection (not shown), each version being embodied in an electronic media file, wherein each version of each of the electronic media compositions has the same unique identifier and shares a set of identical attributes associated with one of the electronic media compositions; (3) providing a plurality of electronic media libraries at 202, each electronic media library comprising the same collection of electronic media compositions, wherein a different version of each electronic media composition resides in each of the plurality of electronic media libraries; (4) generating or providing a daily log or a plurality of daily logs at 203 comprising an ordered list of electronic media compositions selected from the collection of electronic media compositions, each electronic media composition in the daily log having an associated time of day designating when each electronic media composition is scheduled to be played in a 24-hour period; (5) providing an automation system at 204 that interfaces with the plurality of electronic media libraries to generate an output comprising a plurality of playback streams at 235; (5) sending, by the computer, the output from the automation system to an encoder configured to receive and encode the plurality of playback streams at 240; (6) sending, by the computer, the encoded plurality of playback streams to an electronic media streaming server at 250; (7) sending, by the computer, the plurality of playback streams from the electronic media streaming server to a backend API at 250; and (8) sending, by the computer, the plurality of playback streams from the backend API to an end device at 250. Notably, the playback streams can be configured to stream at the same time and in a synchronized manner. Furthermore, the end device can be configured to allow a user to select or switch between different versions of an electronic media composition in real time at 265, where the version selected by the user is output at the end device at 270.

Figure 2B:
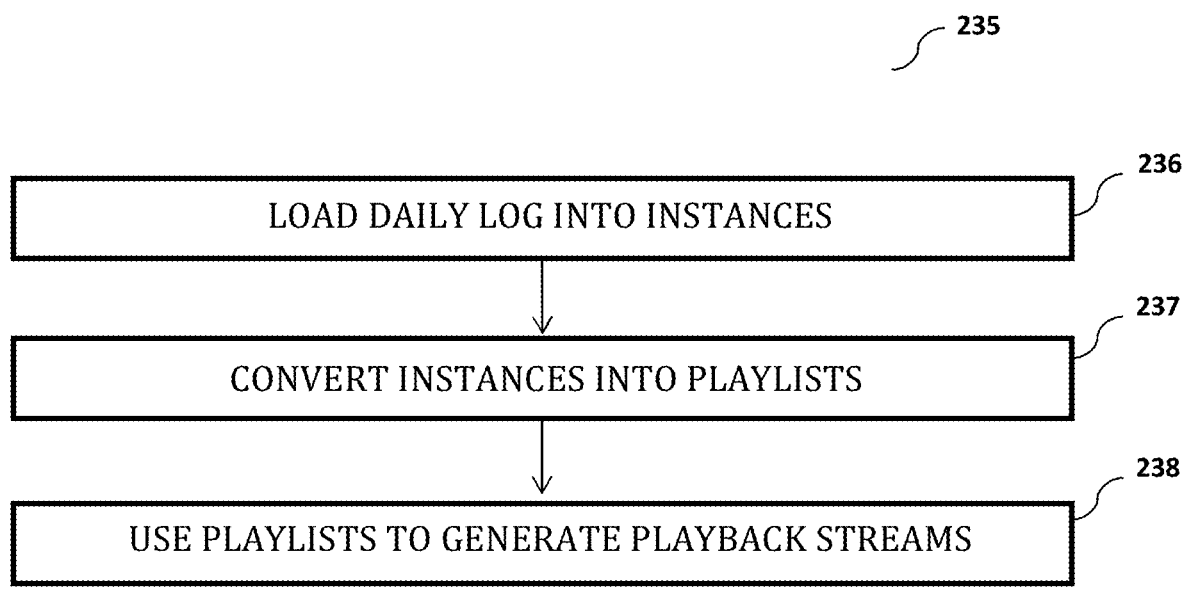

As shown in FIGS. 2A and 2B, the automation system can be configured at 235 to independently perform the steps of: (1) loading the daily log into a plurality of instances, each of the instances corresponding to a respective electronic media library in the plurality of electronic media libraries; (2) converting the plurality of instances into a plurality of identical playlists associated with each of the respective media libraries, each identical playlist comprising the ordered list of electronic media compositions in the daily log; and (3) using each of the identical playlists, generating an output comprising a plurality of playback streams. Each of the plurality of playback streams can correspond to the electronic media files in each of the respective electronic media libraries in the plurality of electronic media libraries.

Figure 11:
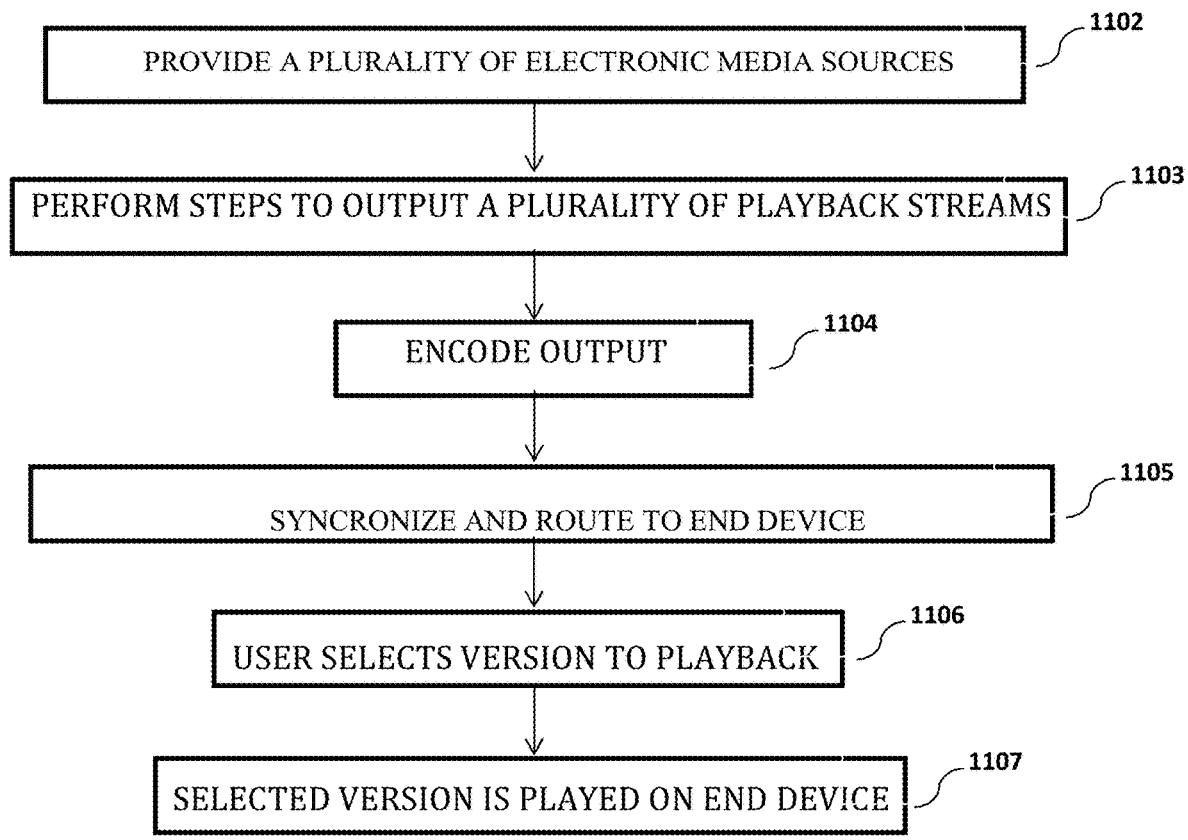
FIG. 11 shows an exemplary embodiment of computer-implemented method of playing one or more electronic media files that allows a user to switch between different versions of an electronic media sources.

In one exemplary embodiment, as shown in FIG. 11, is a computer-implemented method of playing one or more electronic media sources that allows a user to switch between different versions of an electronic media composition. In some embodiments, no daily log is provided. In some embodiments, no automation system is provided. For example, a situation where no daily log or automation system is provided may be when the electronic media source comprises one or more live sources 1102. In some embodiments, the one or more live sources can comprise sources from one or more DJs performing live. In some embodiments, the one or more live sources can comprise sources from one radio broadcast system in one time zone (e.g., East coast feed) and the other radio broadcast system in another time zone (e.g., West coast feed). In some embodiments, the one or more electronic media sources can comprise a plurality of subfeeds from a single station. In other embodiments, the one or more electronic media source can comprise a pretaped feed. In addition, the method can comprise performing steps to output a plurality of playback streams 1103 and encoding the output 1104. In addition embodiments, the method comprises synchronizing and routing the encoded output to an end device 1105. In further embodiments, the user selects the version to play back 1106 and the selected version is played on the end device 1107.

The electronic media composition in the method can comprise at least one of an audio composition and a video composition and the different versions of the electronic media composition can comprise a censored version and an uncensored version. In other embodiments, the different versions of the electronic media composition comprise an original version an at least one altered version. In some embodiments, the number of altered versions is 1, 2, 3, 4, 5, 6, 7, 8, 9, 10, or more. In further embodiments, the original version and the at least one altered version have different lengths of time, different sizes, or different attributes.

The end device of the method can be configured to allow a user to switch between different versions of the electronic media composition in real time by, for example, pressing a surface of the end device, sliding a finger across a surface of the end device, shaking the end device, making a gesture sensed by the end device, providing a motion sensed by the end device, or any other user action that can be recognized by the end device.

Electronic Media

In some embodiments, the platforms, systems, media, and methods described herein include electronic media, or use of the same. In various embodiments, electronic media comprises media suitable for display on television, radio, Internet, smart phones, electronic display devices including e-books and e-readers, fax, CD-ROMs, DVD, and any other medium that utilizes electricity or digital encoding of information. The information is optionally formatted as video recordings, audio recordings, multimedia presentations, slide presentations, interactive media, CD-ROM, and online content and may take the form of digital or analog electronic data. Various subject matter or content can include, for example, television shows, movies, music videos, talk shows, songs, performances, news reports, advertising, sporting events, and other types of informational presentations or recordings made for entertainment.

Versions of Media

In some embodiments, the platforms, systems, media, and methods described herein include multiple versions of electronic media, or use of the same. In various embodiments, the platforms, systems, media, and methods described herein utilize 2, 3, 4, 5, 6, 7, 8, 9, 10 or more versions of each electronic media.

Different versions of the electronic media may exist to manage or control specific language, sounds, or graphical content. For example, in order to allow electronic media compositions to be played wherever possible, it may be necessary to censor particular words or language that may be considered explicit or inappropriate. Similarly, in the case of video, it may be desirable to censor certain graphical content or images that may be considered explicit or inappropriate for a particular audience. Censorship may be accomplished using various different methods including, for example: blanking (silencing the volume), bleeping (playing a noise over the explicit language); re-sampling (overriding the explicit language with a similar vocal or music); re-singing (replacing the explicit language with other language); back-masking (reversing the audio); repeating (repeating the word before the explicit language in place of the explicit language); skipping (deleting the explicit language); cutting; disc scratching (making a word sound like another word); robo-voicing (making the word non-understandable); and distorting. Censorship for video or images may be accomplished using techniques to blank out, distort, block or otherwise prevent the explicit graphical content from being clearly viewed. Different versions of electronic media may comprise varying degrees or the use of various methods of censorship. The degree of censorship may correspond to providing a rating for a song, video, or other electronic media composition as to its suitability for certain audiences based on its content. For example, an uncensored version of a movie may be rated as R—restricted, but a censored version of the same movie may result in a PG-13 rating, while further censoring may result in a G (General Audiences) rating. A similar scheme may be applied to other electronic media formats, as described above including television shows, movies, music videos, talk shows, songs, performances, news reports, advertising, sporting events, and other types of informational presentations or recordings made for entertainment.

In additional embodiments, different versions of the electronic media may comprise of alternative versions of an original composition not limited to censorship. By way of example, an embodiment may exist where the original composition may switch to a first feed (first variation A), a second feed (second variation B), a third feed (third variation C), etc. In some embodiments, the original composition and alternative versions of an original composition may comprise of an electronic media sources from a live feed. In some embodiments, the composition comprises feeds from different time zones (e.g., West Coast feed versus East Coast feed) and locations. In some embodiments, the original composition and alternative version of the original composition comprise of feeds from separate DJs or different broadcast stations. In other embodiments, the feeds comprise subfeeds from one station. The number of feeds may be 1, 2, 3, 4, 5, 6, 7, 8, 9, 10, or more. In additional embodiments, the plurality of feeds comprising variations of the original composition may comprise files of different lengths and data sizes than the original composition.

User Interactions

In some embodiments, the platforms, systems, media, and methods described herein include detecting and responding to user interactions, or use of the same. User interactions include, for example, applying pressure to or performing a motion sensed by a device such as a finger press on an icon or button, a swipe or swiping motion, click, making a motion over a sensor on the device, shaking or otherwise moving the device, speaking, clapping, or giving an audible command or indication sensed by the device, or any other type of UI gesture implemented by a developer. Notably, a user may not have to physically contact the device to cause an interaction—the device may respond to a motion, to a voice, or to some other audible command.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Referring to FIG. 1A, in a particular embodiment, an exemplary digital processing device 101 is programmed or otherwise configured to provide an electronic media file playback application that allows a user to switch between different versions of an electronic media composition in real time. In this embodiment, the digital processing device 101 includes a central processing unit (CPU, also "processor" and "computer processor" herein) 105, which can be a single core or multi core processor, or a plurality of processors for parallel processing. The digital processing device 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage and/or electronic display adapters. The memory 110, storage unit 115, interface 120 and peripheral devices 125 are in communication with the CPU 105 through a communication bus (solid lines), such as a motherboard. The storage unit 115 can be a data storage unit (or data repository) for storing data. The digital processing device 101 can be operatively coupled to a computer network ("network") 130 with the aid of the communication interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130, in some cases with the aid of the device 101, can implement a peer-to-peer network, which may enable devices coupled to the device 101 to behave as a client or a server.

Continuing to refer to FIG. 1A, the CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and write back. The CPU 105 can be part of a circuit, such as an integrated circuit. One or more other components of the device 101 can be included in the circuit. In some cases, the circuit is an application specific integrated circuit (ASIC) or a field programmable gate array (FPGA).

Continuing to refer to FIG. 1A, the storage unit 115 can store files, such as drivers, libraries, including, for example, the electronic media libraries described herein, and saved programs. The storage unit 115 can store user data, e.g., user preferences and user programs. The digital processing device 101 in some cases can include one or more additional data storage units that are external, such as located on a remote server that is in communication through an intranet or the Internet.

Continuing to refer to FIG. 1A, the digital processing device 101 can communicate with one or more remote computer systems through the network 130. For instance, the device 101 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 101, such as, for example, on the memory 110 or electronic storage unit 115. The machine executable or machine readable code can be provided in the form of software. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 3:
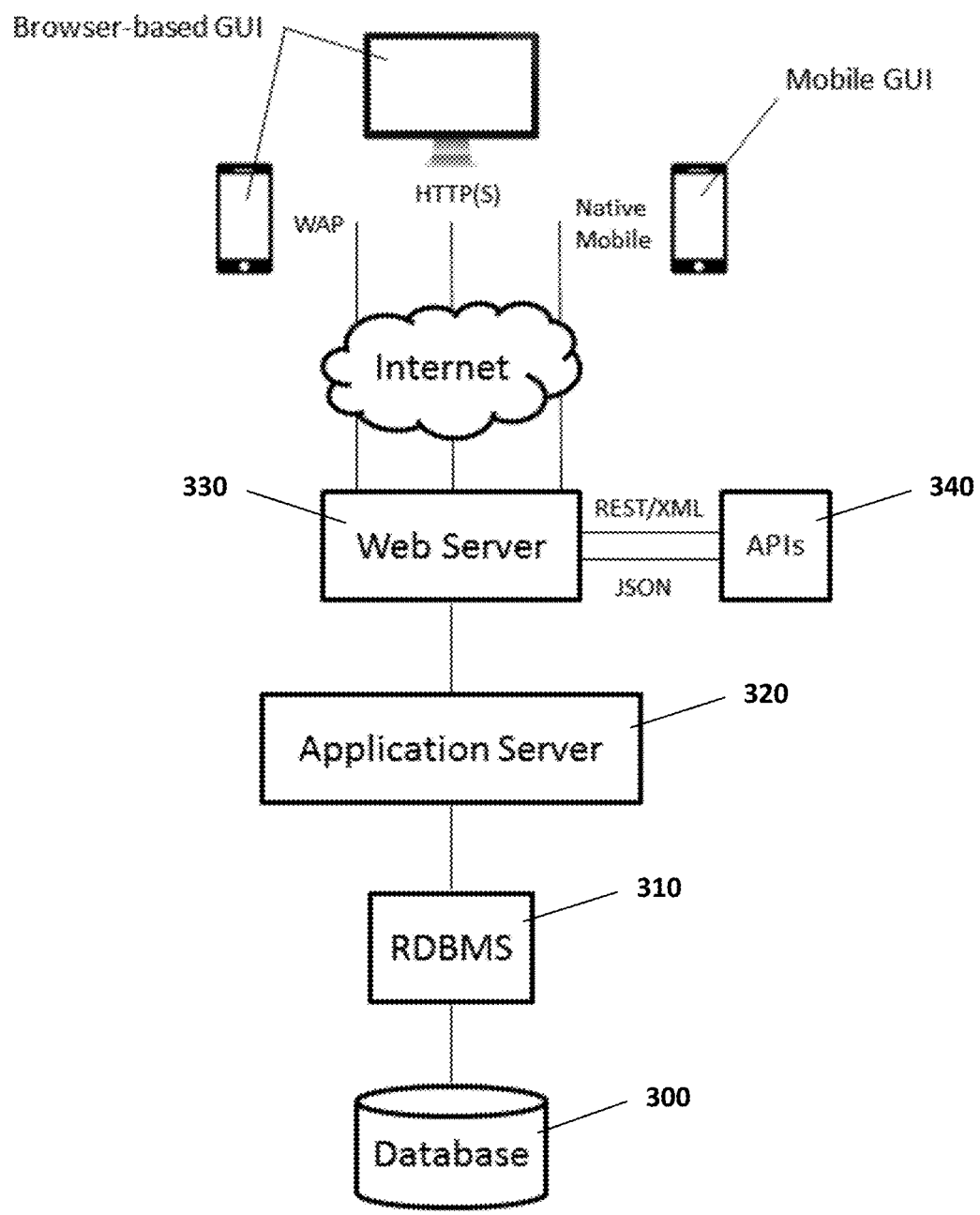
FIG. 3 shows a non-limiting example of a web/mobile application provision system; in this case, a system providing browser-based and/or native mobile user interfaces.

Referring to FIG. 3, in a particular embodiment, an application provision system comprises one or more databases 300 accessed by a relational database management system (RDBMS) 310. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 320 (such as Java servers, .NET servers, PHP servers, and the like) and one or more web servers 330 (such as Apache, IIS, GWS and the like). The web server(s) optionally expose one or more web services via app application programming interfaces (APIs) 340. Via a network, such as the Internet, the system provides browser-based and/or mobile native user interfaces.

Figure 4:
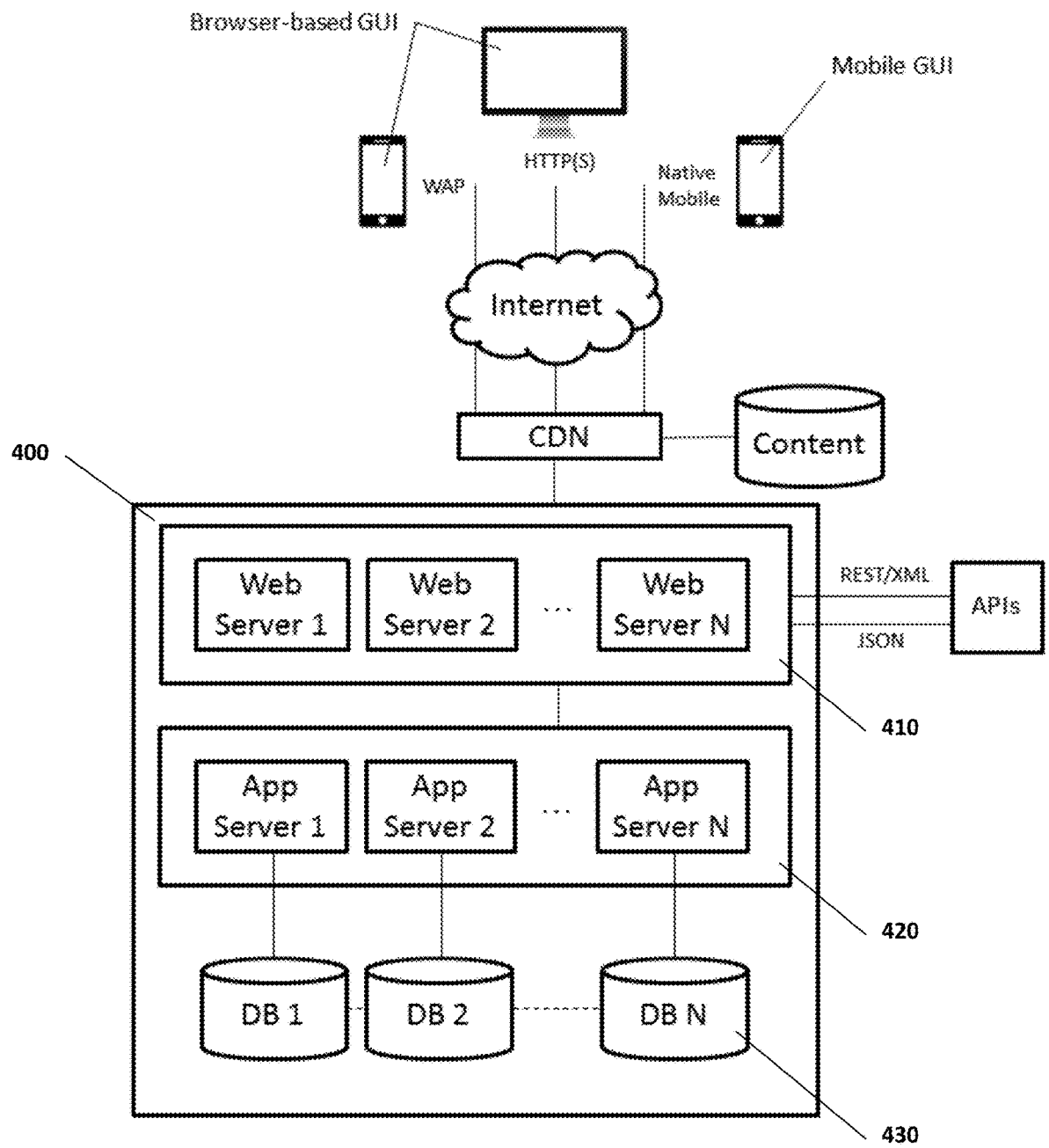
FIG. 4 shows a non-limiting example of a cloud-based web/mobile application provision system; in this case, a system comprising an elastically load balanced, auto-scaling web server and application server resources as well synchronously replicated databases.

Referring to FIG. 4, in a particular embodiment, an application provision system alternatively has a distributed, cloud-based architecture 400 and comprises elastically load balanced, auto-scaling web server resources 410 and application server resources 420 as well synchronously replicated databases 430.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of electronic media files stored for example in electronic media file libraries. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1

A censored/uncensored channel/station can be created as follows. In addition, the procedure described herein can be applied to live streaming and/or m3u playlist based systems.

First, in order to generate or provide a plurality of libraries, any brand of music automation play-out system can be used as long as each library is configured to contain the exact same collection of compositions. Although the collection is the same—i.e., the same compositions exist in each library, a different version of each composition is stored in the different libraries.

As an example, as shown in FIG. 1B, two music libraries 105 and 106 can created within the Automation System 104, each having the same collection of songs. The songs that exist in each of the two libraries are essentially identical, except that one song is censored and the other is uncensored. Thus, if 300 censored songs exist in Library A, then 300 uncensored songs must exist in Library B. The 300 songs must match in title, artist, length, and substantive content, with the only difference being that there are two versions—censored and uncensored—for each song. An alternate version of these songs that does not match in the particular attributes listed above cannot be used. It is also critical in the case of using Music Scheduling software that all of the songs in the duplicate libraries have unique matching identifiers (e.g., CUT ID's, SONG ID's, or other identifiers or terminology as used within the play-out system). In other embodiments, an alternate version with different attributes may be used.

FIGS. 5A and 5B show a view of two music libraries—one containing the censored version 505 and the other containing the uncensored version 506 of a collection of audio compositions. This particular view of the libraries shows various attributes of the compositions, including but not limited to: GROUP 510, CUTID 511, TITLE 512, ARTIST 513, and LENGTH 514. As shown in FIGS. 5A and 5B, the view of the libraries is identical (i.e., songs having the same unique identifier, CUTID, also have identical attributes) since the collection of songs is the same in each library.

Figure 6:
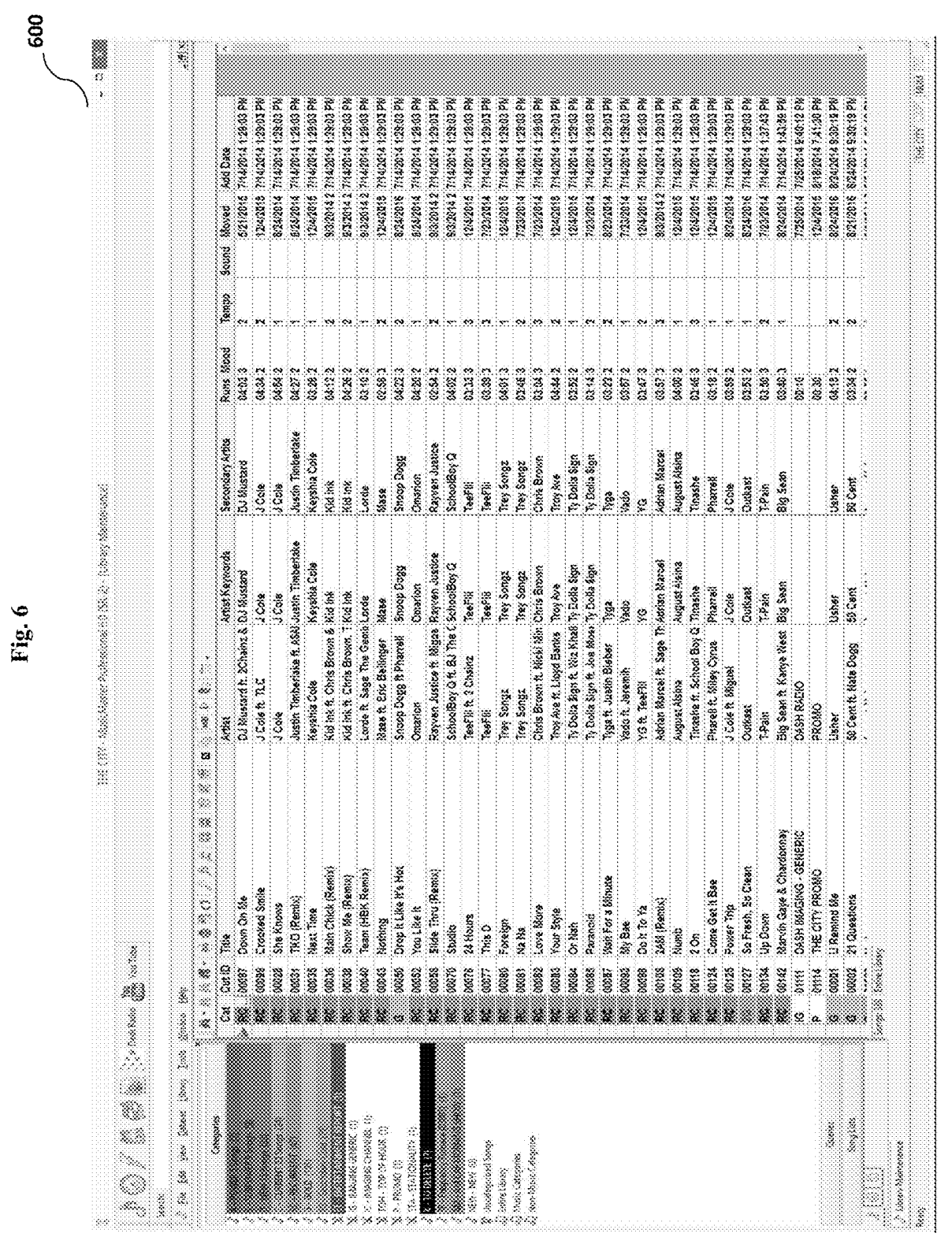

As shown in FIG. 6, to create identical playlists that play in real time and in sync, only one instance 600 of Music Scheduling software has to be used. The method and system as disclosed herein is agnostic to the scheduling software used as long as the scheduling software is capable of creating a daily log, a music schedule, and/or a playlist. Music Scheduling software that may be used to practice the method and system disclosed herein can include Selector, Music Master, Power Gold, or other scheduling software as known in the art or yet to be developed.

Figure 7:
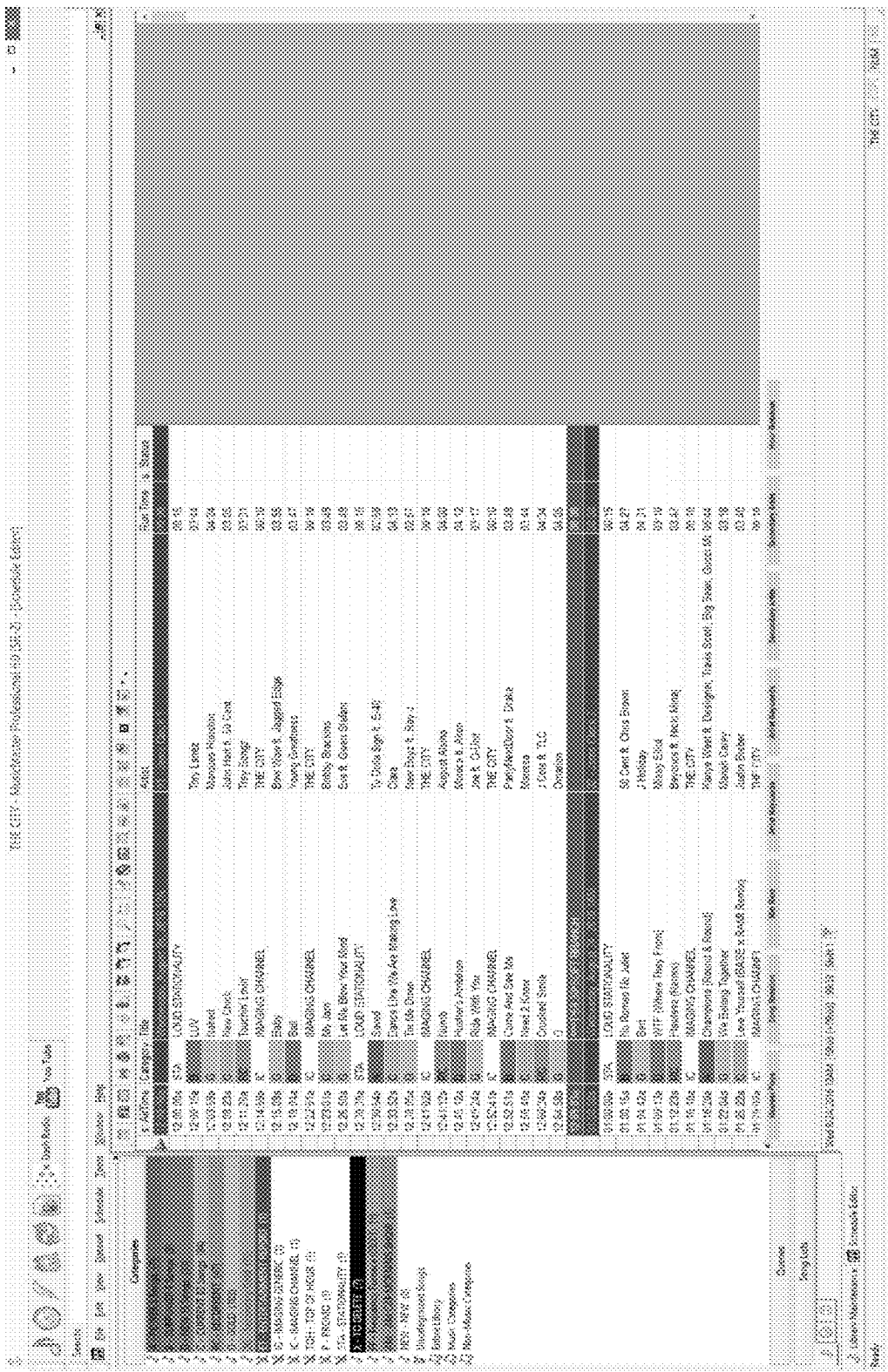
FIG. 7 shows a view of an exemplary embodiment of a daily log as used in an exemplary method and system of the present disclosure.

As shown in FIG. 7, Music Scheduling software can be used to create a daily log 700 that is exported to a Music Playout system of choice (e.g., NexGen, Enco, Wide Orbit, or other music playout systems as known in the art or yet to be developed). In other embodiments, a plurality of daily logs are created and exported. In some embodiments, no daily logs are created and exported.

In this case, as shown in FIGS. 8A and 8B, the single daily log can be loaded into two instances 805 and 806 of the Automation System corresponding to the censored and uncensored songs in the two music libraries 105 and 106 shown in FIG. 1B. Note that, when ingesting the single daily log into the Automation System or database, it is important to ensure that the path leads to both the censored and uncensored libraries, thus creating two identical playback engines each with its own stream destination. Utilizing the built-in timing of the Automation System or database, both playbacks stay in sync. In other embodiments, the single daily log can be loaded into two instances corresponding to alternative versions of a composition (e.g., not limited to just a censored and a non-censored version). In other embodiments, a plurality of daily logs (rather than just a single daily log) may be loaded into a plurality of feeds and composition versions. In some embodiments, the plurality of feeds and composition versions may have different lengths and data sizes than each other.

By utilizing the time events, for example as shown at 701 in FIG. 7, in any of the aforementioned Music Playout systems, the Automation System will playback the two versions (censored and uncensored) of the same song synchronized and at the exact same time.

As shown in FIG. 1B, playback audio from the Automation System 104 is sent from the audio streaming computer 150 to a backend API 160 that sends dual streams to the end device 170. The playback audio is sent to the app/website via audio encoders. As shown in FIGS. 9A and 9B, each channel has a unique URL or database address.

Figure 10A:
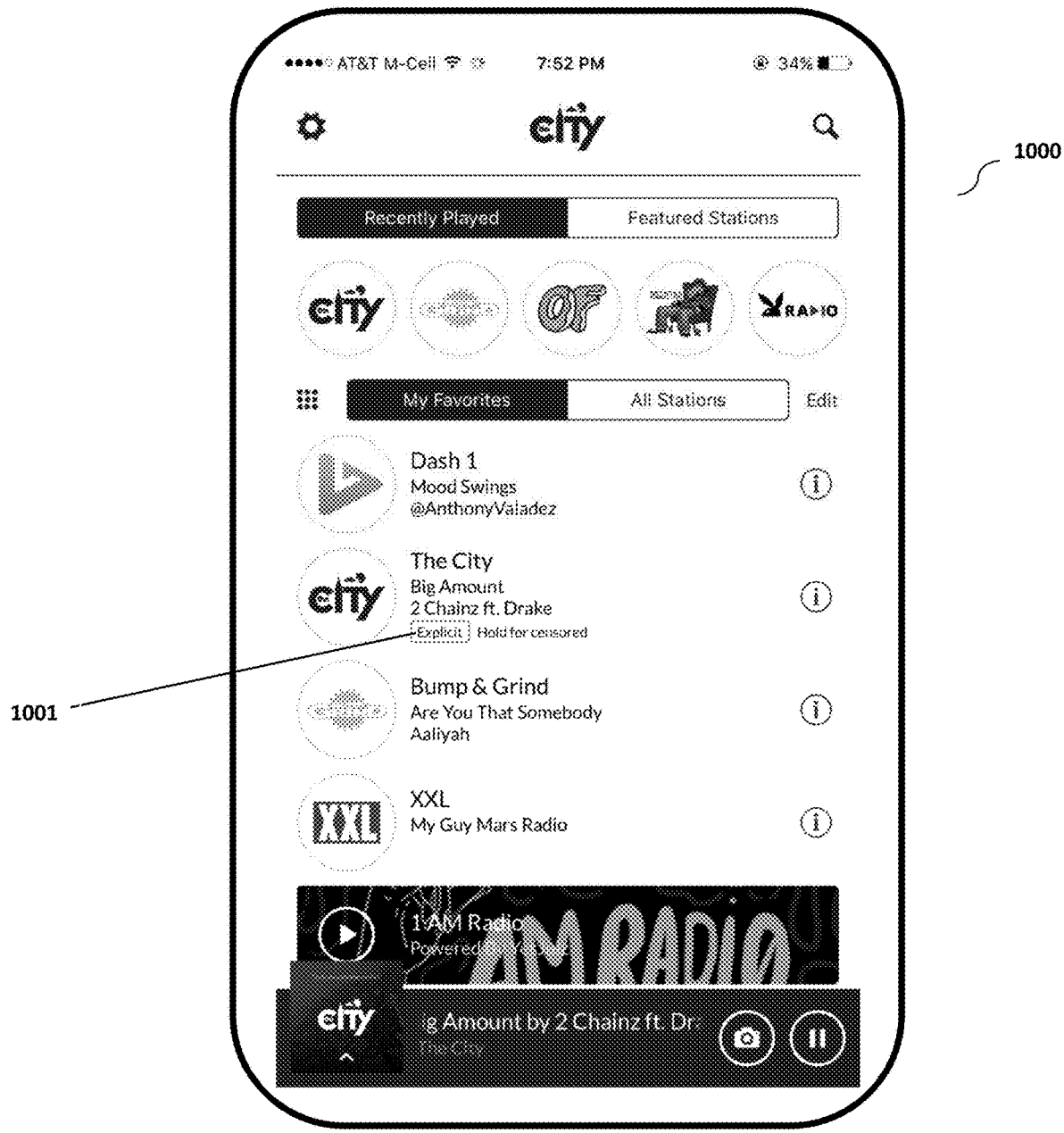
FIGS. 10A and 10B show an exemplary view of an interface on a mobile device in an exemplary method and system of the present disclosure.
Figure 10B:
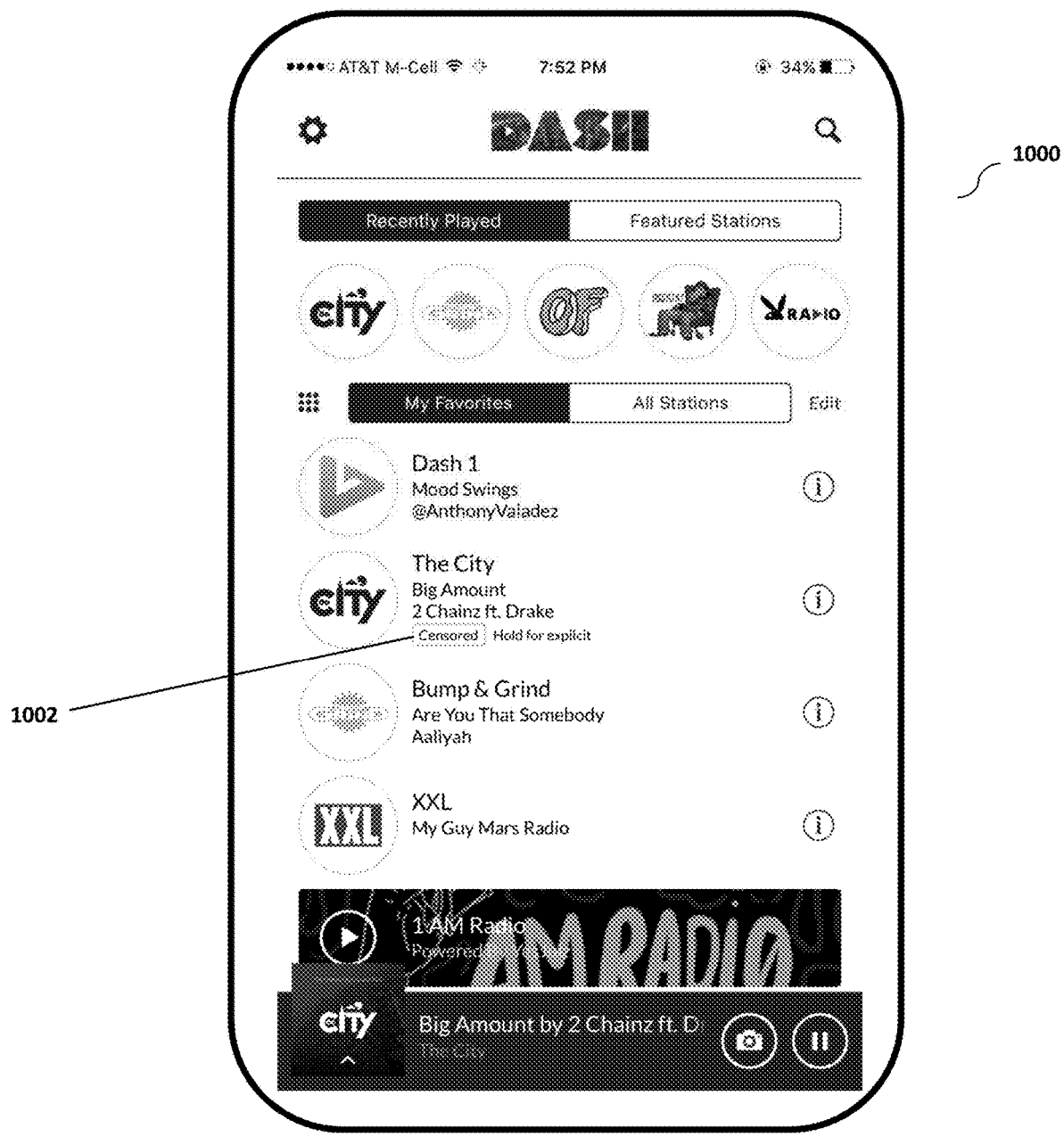

Both streams are not visible to the end user, but by using a gesture on a user's end device, web page, in car audio player, the end user is able to choose at will a censored or uncensored version of the content he or she wishes to consume. FIGS. 10A and 10B show an example of how a user action or gesture that may be used on a mobile phone. In this case, pressing or clicking on an icon on the screen 1000 of a mobile phone allows the end user to choose the censored 1002 or explicit (i.e., uncensored) 1003 version of a song or show in real time. In so doing, the user is able to seamlessly switch between a first composition and a second composition without having to start at the beginning of the second composition.

Example 2

A censored/uncensored channel/station can also be created for live shows. The procedure for live shows would be similar to the procedure described above in Example 1 except that the plurality of libraries, Music Scheduling software, Automation System, and music automation playout system would be replaced by a studio board having an operator who would be performing the censoring or editing of the live show in real time, wherein the censored version of the live show would be sent straight to the app/website via audio encoders. The live dual streams (censored and uncensored) can be sent from the audio streaming computer 150 to a backend API 160 to the end device 170.

Both streams are not visible to the end user, but by using a gesture on a user's end device, web page, in car audio player, the end user is able to choose at will the censored or uncensored version of the live show he or she wishes to consume. FIGS. 10A and 10B show an example of how a user action or gesture that may be used on a mobile phone. In this case, pressing or clicking on an icon on the screen 1000 of a mobile phone allows the end user to choose the censored 1002 or explicit (i.e., uncensored) 1003 version of the live performance in real time.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A platform comprising:
a. a mobile processor configured to execute instructions from one or more software modules to provide an electronic media file playback application that allows a user to switch between different versions of an electronic media composition in real time, the one or more software modules comprising:
   i. a scheduling software module comprising instructions for generating at least one daily log comprising an ordered list of electronic media compositions, each electronic media composition in the at least one daily log having an associated time of day designating when each electronic media composition is scheduled to be played in a 24-hour period;
   ii. an automation software module comprising instructions for:
      1. loading the at least one daily log into a plurality of instances, each of the instances corresponding to an electronic media library in a plurality of electronic media libraries;
      2. converting the plurality of instances into a plurality of identical playlists associated with each of the electronic media libraries, each identical playlist comprising the ordered list of electronic media compositions in the at least one daily log;
      3. generating an output comprising a plurality of playback streams using each of the identical playlists, wherein each of the plurality of playback streams corresponds to electronic media files in each of the electronic media libraries in the plurality of electronic media libraries;
   iii. an encoder software module comprising instructions for encoding the plurality of playback streams:
b. a server processor configured to execute instructions from one or more software modules to provide an electronic media file playback application that allows a user to switch between different versions of an electronic media composition in real time, the one or more software modules comprising:

i. a software module comprising instructions to route the plurality of playback streams from an encoder to a streaming server, to a backend API, and to an end device, wherein the plurality of playback streams are configured to stream at the same time and in a synchronized manner and wherein the end device is configured to allow a user to play an electronic media composition and switch between different versions of the electronic media composition in real time.

2. The platform of claim 1, wherein the electronic media composition comprises at least one of an audio composition and a video composition and the different versions of the electronic media composition comprise a censored version and an uncensored version.

3. The platform of claim 1, wherein the at least one daily log comprises a plurality of daily logs.

4. The platform of claim 1, wherein the different versions of the electronic media composition comprise an original version and at least one altered version.

5. The platform of claim 4, wherein the original version and the at least one altered version have different lengths of time.

6. A computer-implemented system to provide an electronic media file playback application that allows a user to switch between different versions of an electronic media composition in real time comprising: a digital processing device comprising:
   a. at least one processor,
   b. an operating system configured to perform executable instructions,
   c. a memory, wherein the memory comprises storage for housing a collection of electronic media compositions, wherein each of the electronic media compositions in the collection has a unique identifier and different versions of each of the electronic media compositions in the collection are stored in a plurality of electronic media libraries, wherein each of the electronic media libraries comprises the same collection of electronic media compositions, and wherein a different version of each electronic media composition resides in each of the plurality of electronic media libraries;
   d. and a computer program including instructions executable by the digital processing device for:
      i. generating at least one daily log comprising an ordered list of electronic media compositions, each electronic media composition in the at least one daily log having an associated time of day designating when each electronic media composition is scheduled to be played in a 24-hour period;
      ii. loading the at least one daily log into a plurality of instances, each of the instances corresponding to each of the electronic media libraries in the plurality of electronic media libraries;
      iii. converting the plurality of instances into a plurality of identical playlists associated with each of the electronic media libraries, each identical playlist comprising the ordered list of electronic media compositions in the at least one daily log;
      iv. using each of the identical playlists, generating an output comprising a plurality of playback streams, wherein each of the plurality of playback streams corresponds to the electronic media files in each of the electronic media libraries in the plurality of electronic media libraries;
      v. sending the generated output to an encoder configured to receive and encode the plurality of playback streams;
      vi. encoding the plurality of playback streams;
      vii. sending the encoded plurality of playback streams to an electronic media streaming server;
      viii. sending the encoded plurality of playback streams from the electronic media streaming server to a backend API;
      ix. sending the encoded plurality of playback streams from the backend API to an end device, wherein the playback streams are configured to stream at the same time and in a synchronized manner and wherein the end device is configured to allow a user to play an electronic media composition and switch between different versions of the electronic media composition in real time.

7. The system of claim 6, wherein the electronic media composition comprises at least one of an audio composition and a video composition and the different versions of the electronic media composition comprise a censored version and an uncensored version.

8. The system of claim 6, wherein the at least one daily log comprises a plurality of daily logs.

9. The system of claim 6, wherein the different versions of the electronic media composition comprise an original version and at least one altered version.

10. The system of claim 9, wherein the original version and the at least one altered version have different lengths of time.

11. Non-transitory computer-readable storage media encoded with a computer program including instructions executable by a processor to provide an electronic media file playback application that allows a user to switch between different versions of an electronic media composition in real time comprising:
   a. a database, recorded on the media, comprising a collection of electronic media compositions, wherein each of the electronic media compositions in the collection has a unique identifier and different versions of each of the electronic media compositions in the collection are stored in a plurality of electronic media libraries, wherein each of the electronic media libraries comprises the same collection of electronic media compositions, and wherein a different version of each electronic media composition resides in each of the plurality of electronic media libraries;
   b. a scheduling software module comprising instructions for generating at least one daily log comprising an ordered list of electronic media compositions, each electronic media composition in the at least one daily log having an associated time of day designating when each electronic media composition is scheduled to be played in a 24-hour period;
   c. an automation software module comprising instructions for:
      i. loading the at least one daily log into a plurality of instances, each of the instances corresponding to an electronic media library in a plurality of electronic media libraries;
      ii. converting the plurality of instances into a plurality of identical playlists associated with each of the electronic media libraries, each identical playlist comprising the ordered list of electronic media compositions in the at least one daily log;
      iii. using each of the identical playlists, generating an output comprising a plurality of playback streams, wherein each of the plurality of playback streams corresponds to electronic media files in each of the electronic media libraries in the plurality of electronic media libraries;
d. an encoder software module comprising instructions for encoding the plurality of playback streams:
e. a software module comprising instructions to route the plurality of playback streams from an encoder to a streaming server, to a backend API, and to an end device, wherein the plurality of playback streams are configured to stream at the same time and in a synchronized manner and wherein the end device is configured to allow a user to play an electronic media composition and switch between different versions of the electronic media composition in real time.

12. The media of claim 11, wherein the electronic media composition comprises at least one of an audio composition and a video composition and the different versions of the electronic media composition comprise a censored version and an uncensored version.

13. The media of claim 11, wherein the at least one daily log comprises a plurality of daily logs.

14. The media of claim 11, wherein the different versions of the electronic media composition comprise an original version and at least one altered version.

15. The media of claim 14, wherein the original version and the at least one altered version have different lengths of time.

16. A computer-implemented method of playing one or more electronic media files that allows a user to switch between different versions of an electronic media composition, the different versions of the electronic media composition being embodied in the one or more electronic media files, the method comprising:
   a) providing a collection of electronic media compositions, wherein each of the electronic media compositions in the collection has a unique identifier;
   b) providing different versions of each of the electronic media compositions in the collection, each version being embodied in an electronic media file, wherein each version of each of the electronic media compositions has the same unique identifier associated with one of the electronic media compositions;
   c) providing a plurality of electronic media libraries, each electronic media library comprising the same collection of electronic media compositions, wherein a different version of each electronic media composition resides in each of the plurality of electronic media libraries;
   d) generating at least one daily log comprising an ordered list of electronic media compositions selected from the collection of electronic media compositions, each electronic media composition in the at least one daily log having an associated time of day designating when each electronic media composition is scheduled to be played in a 24-hour period;
   e) providing an automation system that interfaces with the plurality of electronic media libraries, the automation system independently performing the steps of:
      i. loading the at least one daily log into a plurality of instances, each of the instances corresponding to a respective electronic media library in the plurality of electronic media libraries;
      ii. converting the plurality of instances into a plurality of identical playlists associated with each of the respective media libraries, each identical playlist comprising the ordered list of electronic media compositions in the at least one daily log;
      iii. using each of the identical playlists, generating an output comprising a plurality of playback streams wherein each of the plurality of playback streams corresponds to the electronic media files in each of the respective electronic media libraries in the plurality of electronic media libraries;
   f) sending, by the computer, the output from the automation system to an encoder configured to receive and encode the plurality of playback streams;
   g) sending, by the computer, the encoded plurality of playback streams to an electronic media streaming server;
   h) sending, by the computer, the plurality of playback streams from the electronic media streaming server to a backend API;
   i) sending, by the computer, the plurality of playback streams from the backend API to an end device, wherein the playback streams are configured to stream at the same time and in a synchronized manner and wherein the end device is configured to allow a user to play an electronic media composition and switch between different versions of the electronic media composition in real time.

17. The method of claim 16, wherein the electronic media composition comprises at least one of an audio composition and a video composition and the different versions of the electronic media composition comprise a censored version and an uncensored version.

18. The method of claim 16, wherein the electronic media compositions shares a set of identical attributes associated with one of the electronic media compositions.

19. The method of claim 16, wherein the electronic media compositions shares a set of different attributes associated with one of the electronic media compositions.

20. The method of claim 16, wherein the different versions of the electronic media composition comprise an original version and at least one altered version.

21. The method of claim 16, wherein the end device is configured to allow a user to switch between different versions of the electronic media composition in real time by pressing a surface of the end device, sliding a finger across a surface of the end device, shaking the end device, making a gesture sensed by the end device, or providing a motion sensed by the end device.

* * * * *